UNITED STATES PATENT OFFICE.

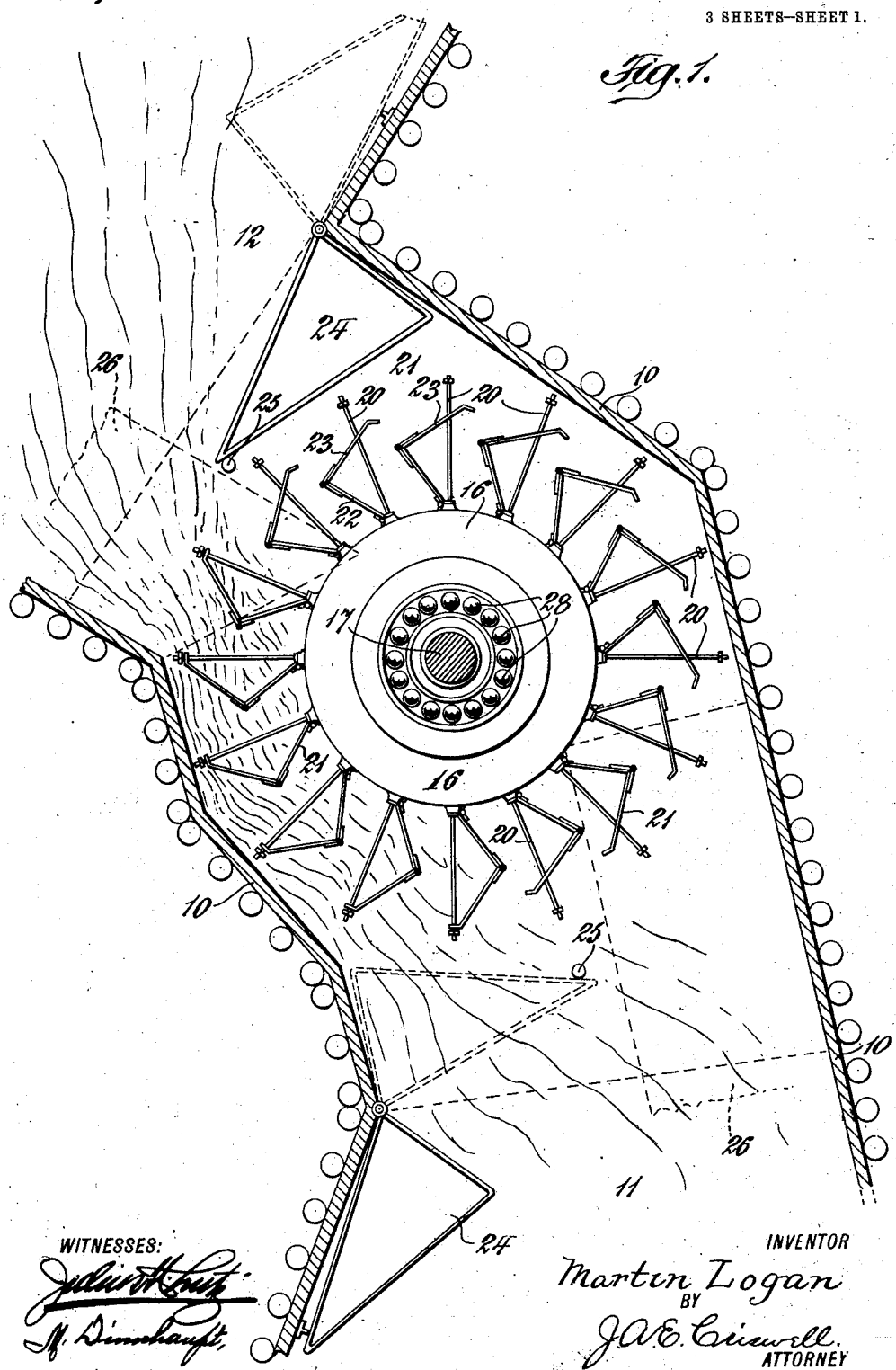

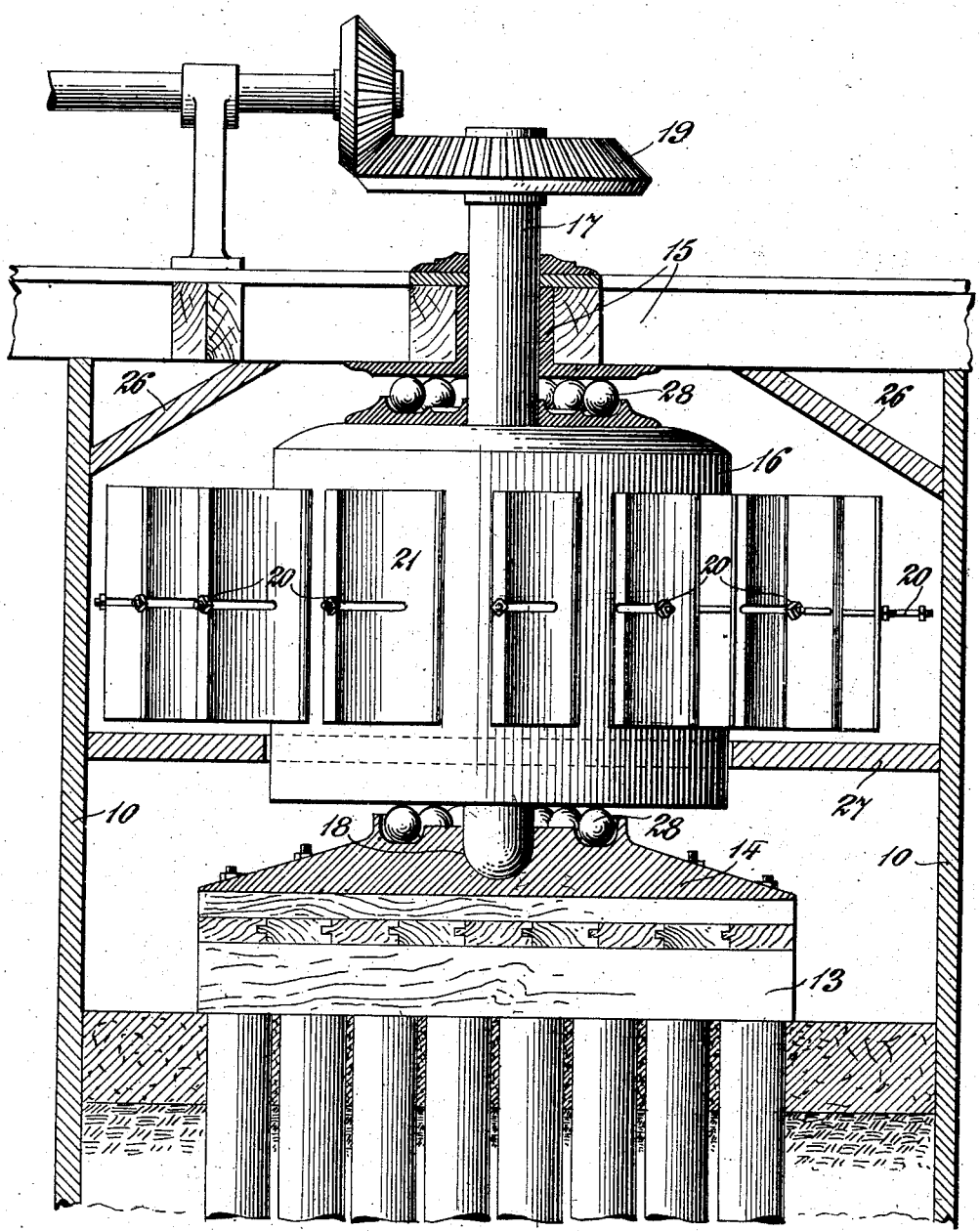

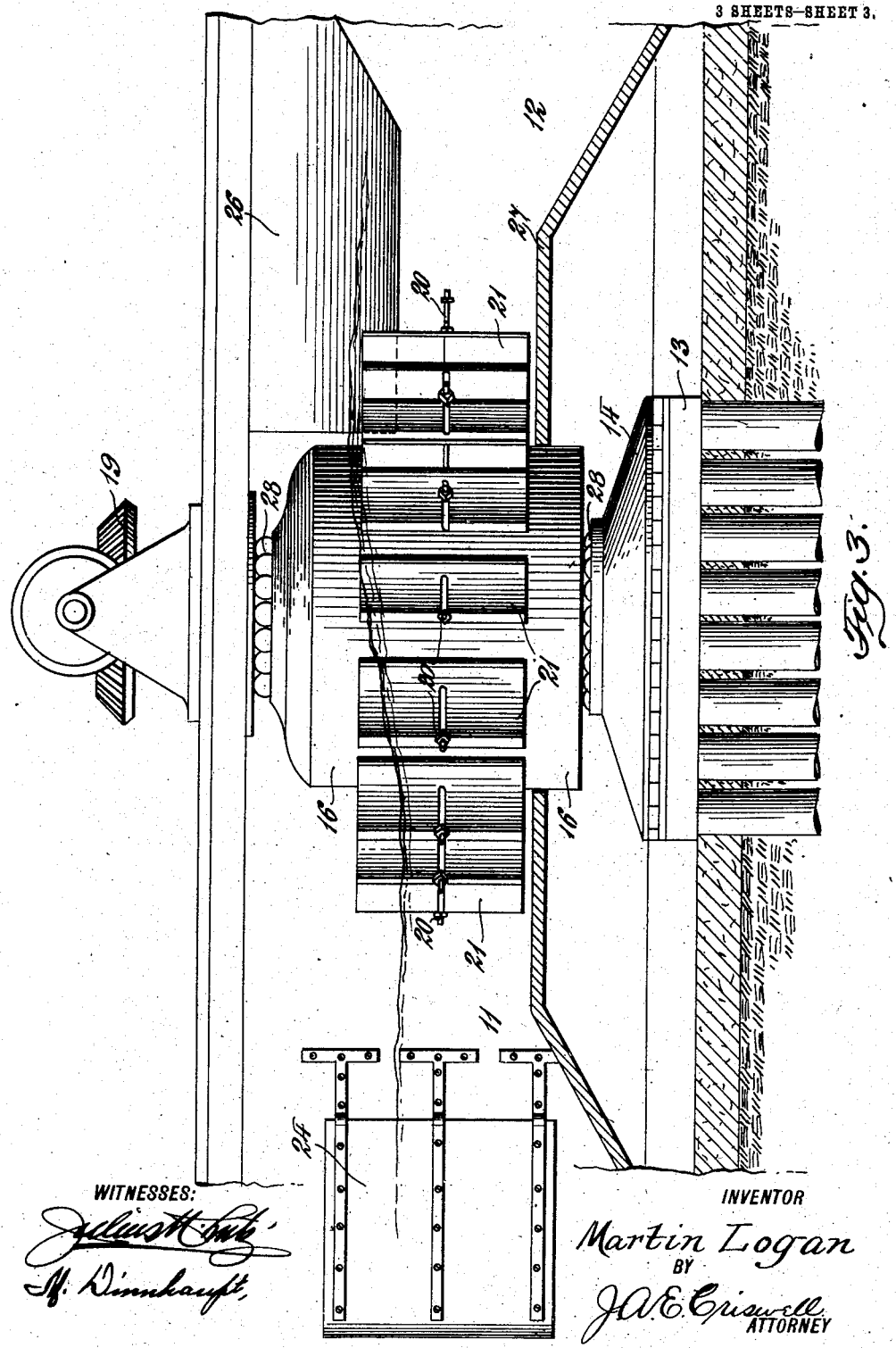

MARTIN LOGAN, OF NEW YORK, N. Y.

TIDE-WATER MOTOR.

973,869.  Specification of Letters Patent.  Patented Oct. 25, 1910.

Application filed October 27, 1909. Serial No. 524,905.

*To all whom it may concern:*

Be it known that I, MARTIN LOGAN, a citizen of the United States, and resident of the borough of Manhattan, city, county, and State of New York, have invented certain new and useful Improvements in Tide-Water Motors, of which the following is a specification, reference being had therein to the accompanying drawings, in which—

Figure 1 is a plan view of a channel forming a tide-way, the water wheel being shown as mounted therein; Fig. 2 a vertical transverse sectional view of the channel, the water wheel being shown in side elevation and the bearings therefor being shown in sectional view; and Fig. 3 a longitudinal vertical sectional view of the channel showing the water wheel and one of the end gates in elevation.

The invention relates to that class of devices wherein the water wheel is driven by the movement of tide water through a restricted channel.

The primary object of the invention is to provide means for automatically deflecting the water from one side of the channel to the other as the direction of flow of the tide reverses, in order that the water wheel may be driven continuously in the same direction without regard to the direction of flow of the tide.

A further object of the invention is to provide tide-operated gates at each end of the channel containing the water wheel, said gates being so swung by the tide as to deflect the water in such a manner as to maintain the wheel constant in its direction of rotation during all tides.

Another important object of the invention is to provide means for so restricting the channel on both sides of the water wheel as to insure the covering of the wheel buckets at all times except at dead low tide.

In carrying out my invention and attaining the various objects I provide a very durable and efficient apparatus which may be comparatively cheaply constructed and installed.

Referring to the various parts by numerals, 10 designates the walls of the channel in which the water wheel is mounted, said channel having restricted entrances 11 and 12. In the center of the channel about midway the restricted entrances is a foundation 13 on which is supported a heavy base or bearing plate 14 for the water wheel.

Extending across the channel and directly above the center of the base-bearing is supported a journal 15 for the upper end of the water wheel shaft. The water wheel consists of a central cylindrical body-portion 16 mounted on a vertical shaft 17 whose lower end rests in a bearing cup 18 formed in the top of the bearing plate 14, the upper end of said shaft extending through the journal 15 and carrying a beveled gear 19 through which power may be transmitted in any suitable manner.

Secured rigidly to the body-portion of the wheel, about midway between the bottom and top thereof, are a series of radially extending rigid bucket-supporting rods 20, said rods being spaced equal distances apart around the wheel. Held to the body-portion of the wheel at the base of each rod is a bucket or water vane 21. Each bucket consists of two hinged portions or leaves 22 and 23, the leaf 22 being hinged to the body-portion of the wheel, as described, and the leaf 23 being hinged to the outer vertical edge of the leaf 22. The outer portion of the leaf 23 is slotted and through said slot extends the rigid bucket supporting rod, said rod being provided with a head, preferably a nut, to prevent the outer leaf moving outwardly off the end of said rod. By means of this construction it is obvious that the leaves of the bucket may be folded inwardly to a limited extent. The two leaves of each bucket are arranged at an angle with each other forming approximately a right angle when in their full extended position, both leaves of the bucket, from their point of connection with the radial bucket-supporting rod, inclining forwardly, that is to say, in the direction of rotation of the water wheel, so that the actuating current of water will flow into the bucket.

Pivoted at the restricted entrances to the channel containing the water wheel are two swinging gates 24, said gates being secured to opposite sides of the channel, as indicated in Fig. 1. These gates are triangular in plan view and extend from a point close to the bottom of the channel to a point approximately level with high tide. These gates are hinged to the side wall of the channel at one of their corners, and in operative position extend approximately half-way across the channel, their outer ends abutting against vertical stops 25.

In operation the water flowing through the channel, will swing one of said gates inwardly across the channel and thereby deflect the inflowing water toward the opposite side wall and toward the buckets on one side of the water wheel. When the tide reverses the direction of its flow and moves outwardly, the gate at the other end of the channel will be swung into position to deflect the water against the buckets on the opposite side of the water wheel and the gate which has been swung across the channel by the inflowing tide will be moved outwardly to the wall of the channel so that the water may flow outwardly beyond the water wheel freely and unobstructed. It is obvious that by means of these automatically swinging gates the direction of rotation of the water wheel will be maintained constant during the rising and falling of the tide. It is obvious that the water buckets which are not in use will be free to collapse slightly when being dragged through the comparatively still water back of the gate which is in operative position thereby reducing the power necessary to move the inactive buckets.

In order to still further restrict the inlets at the water wheel channel, inclined bulk heads 26 are secured to the side walls of the channel and extend upwardly and outwardly over the water wheel buckets, as indicated clearly in Figs. 2 and 3. By this means the entrances to the channel are so choked that the inflowing water will be forced upwardly and over the buckets by the pressure of the body of water seeking to enter the channel, thereby insuring a full supply of water to the buckets even when the tide is comparatively low.

The bottom 27 of the water wheel channel is arranged close to the bottoms of the buckets and the gates, as clearly shown in Figs. 2 and 3 of the drawings. By this means the lower bearing of the water wheel will be protected from all floating material carried by the water flowing through the channel.

As clearly shown in Figs. 2 and 3 of the drawings the water wheel is provided with ball-bearings 28, said bearings maintaining the water wheel in a true vertical position and reducing friction.

From the foregoing it is manifest that I produce a very simple inexpensive and readily installed apparatus wherein the water wheel will be rotated in a constant direction during the variations in flow of the tide.

Having thus fully described my invention, what I claim as new and desire to secure by Letters Patent is:

1. A water motor comprising a channel provided with enlarged entrances and a restricted portion, a water wheel mounted in the restricted portion of said channel and adapted to rotate horizontally, a pair of gates, said gates being pivoted on opposite sides of said channel one at each end thereof and being arranged to swing in a horizontal plane away from the restricted portion of the channel when open, means for arresting the outward open movement of said gates whereby the movement of water through the channel in either direction will open one of said gates and close the other to maintain the direction of rotation of the water wheel constant.

2. A water motor comprising a channel having a restricted portion, a water wheel mounted in the restricted portion of said channel and adapted to rotate horizontally, a pair of horizontally movable gates extending into said channel and adapted to be swung by the movement of the water through the channel, the movement of the water in one direction swinging one gate inwardly across the restricted portion of the channel to a closed position and the other gate outwardly toward the channel wall away from the restricted portion, the reverse movement of the water reversing the movement of the gates.

3. A water motor comprising a channel having a restricted portion, a water wheel mounted in said restricted portion of the channel and adapted to rotate horizontally, a pair of gates pivoted to the side walls of the channel and adapted to be moved inwardly to obstruct the channel on opposite sides of the water wheel, means for limiting the inward movement of said gates in their open position whereby the movement of water through the channel in either direction will cause one of said gates to obstruct the channel and deflect the flowing water toward one side of the water wheel.

4. A water motor comprising a channel having a restricted portion, a water wheel mounted in the restricted portion of said channel and adapted to rotate horizontally, a gate pivoted to the side wall of said channel adjacent to the wheel and adapted to be swung horizontally by the movement of the water through said channel, means for arresting the gate in its inward movement whereby said gate will partially obstruct the channel when the water is moving therethrough in one direction and will be swung outwardly toward the channel wall to free the channel when the water is moving therethrough in the opposite direction.

5. A water motor comprising a channel, a water wheel mounted therein, a gate triangular in horizontal section means for pivoting said gate at one of its angles to the channel wall near the water wheel, means for arresting the inward movement of the gate to cause it to obstruct the channel whereby the gate may be swung in one direction by the movement of the water in the channel and in the opposite direction by the reverse movement of the water.

6. A water motor comprising a channel, a water wheel therein, a pair of gates triangular in horizontal section, one of said gates being pivoted to the channel wall on each side of the water wheel, said gates being mounted on opposite sides of the channel, each of said gates being pivoted at one of its angles, and means to limit the inward movement of said gates whereby said gates will be moved to their open or closed position by the movement of the water through the channel.

7. A water motor comprising a channel, a pair of gates triangular in horizontal section, said gates being pivoted to the channel walls, said gates being mounted on opposite sides of the channel, each of said gates being pivoted at one of its angles, and means to limit the inward movement of said gates whereby said gates will be moved to their open or closed position by the movement of the water through the channel.

8. A tide-water motor comprising a channel, a water wheel mounted therein to rotate horizontally, a portion of said wheel being above low water level, inclined walls extending inwardly and upwardly from the sides of the channel over the water wheel to so obstruct the channel that water will be forced over the water wheel by the pressure of water entering the channel, a gate supported on the side of the channel near the water wheel and adapted to be swung inwardly to partially obstruct the channel by water flowing to the water wheel.

9. A tide-water motor comprising a channel having a restricted portion for the passage of the water, a water wheel mounted in the restricted portion and arranged to rotate horizontally, a pair of movable gates in said channel one on each side of the water wheel and on opposite sides of the channel, said gates being arranged to be automatically closed to obstruct the channel by water flowing to the water wheel and to be automatically opened to free the channel of water flowing from the water wheel.

10. A tide-water motor comprising a channel having a restricted portion, a water wheel mounted in said restricted portion and arranged to rotate horizontally, means extending outwardly from opposite sides of the channel and on opposite sides of the water wheel to divert the water, said diverting means being automatically moved to its closed position by water flowing to the water wheel, to partially obstruct the channel, and being moved by water flowing from the water wheel, to its open position to free the channel.

11. A tide water motor comprising a channel, a water wheel having radially projecting rods and a plurality of buckets held to the wheel at one end of the rods and comprising two hinged members, one of which is adapted to move inwardly or outwardly, and means located on opposite sides of the water wheel to divert the water, said diverting means being moved to its closed position by water flowing to the water wheel and being moved by water flowing from the water wheel from its open position to free the channel.

12. A tide water motor comprising a channel, a water wheel having a plurality of buckets held to the wheel at one end and comprising two hinged members, one of which is adapted to move inwardly or outwardly, and means located on opposite sides of the water wheel to divert the water.

This specification signed and witnessed this 25" day of October A. D. 1909.

MARTIN LOGAN.

Witnesses:
M. F. KEATING,
M. DINNHAUPT.